Dec. 9, 1952 H. MENDELSON 2,621,286
RADIO RECEIVER CASE, INCLUDING SNAP-LOCK FASTENER
Filed March 17, 1951 2 SHEETS—SHEET 1
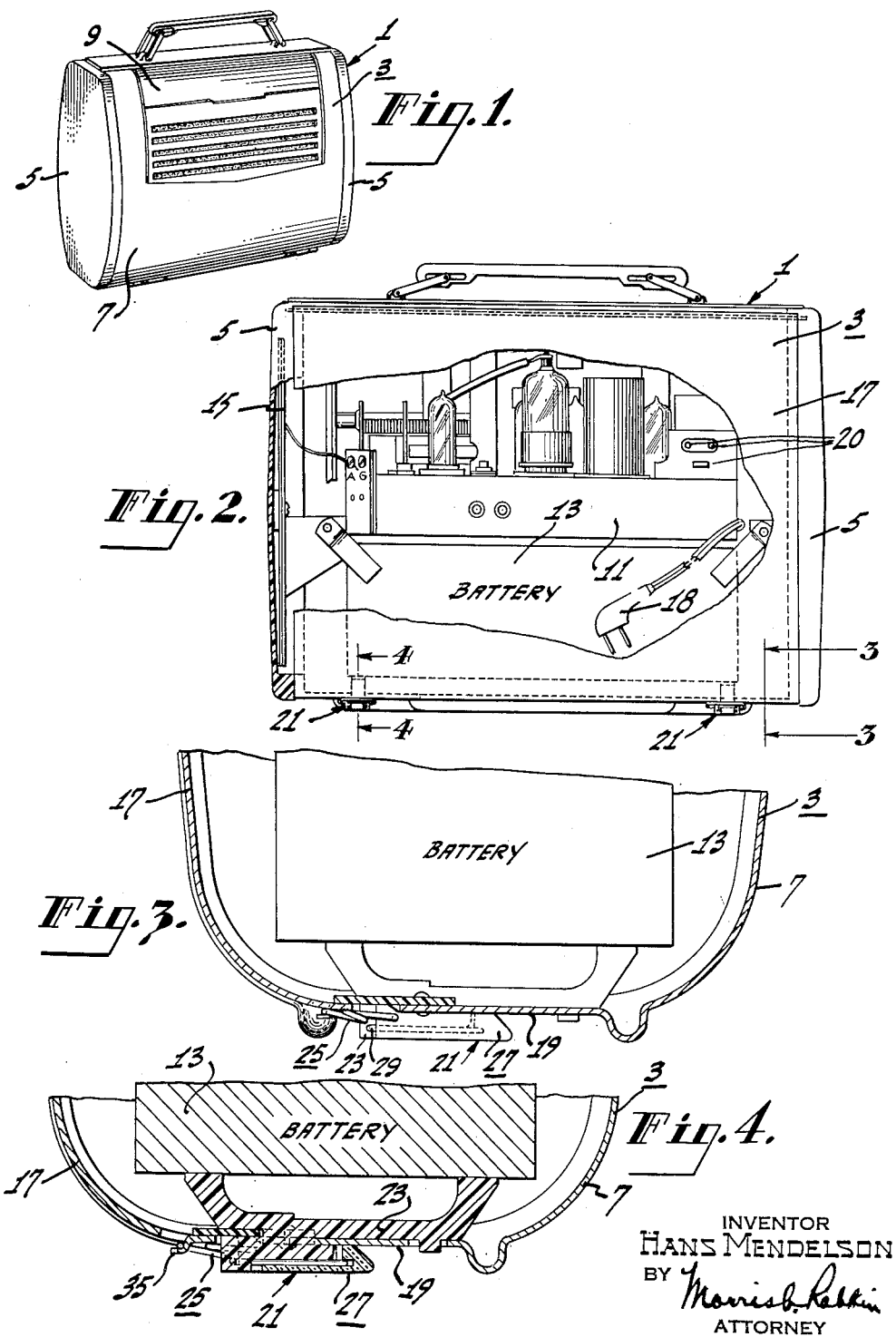
INVENTOR
HANS MENDELSON
BY
ATTORNEY Dec. 9, 1952          H. MENDELSON          2,621,286
RADIO RECEIVER CASE, INCLUDING SNAP-LOCK FASTENER
Filed March 17, 1951          2 SHEETS—SHEET 2
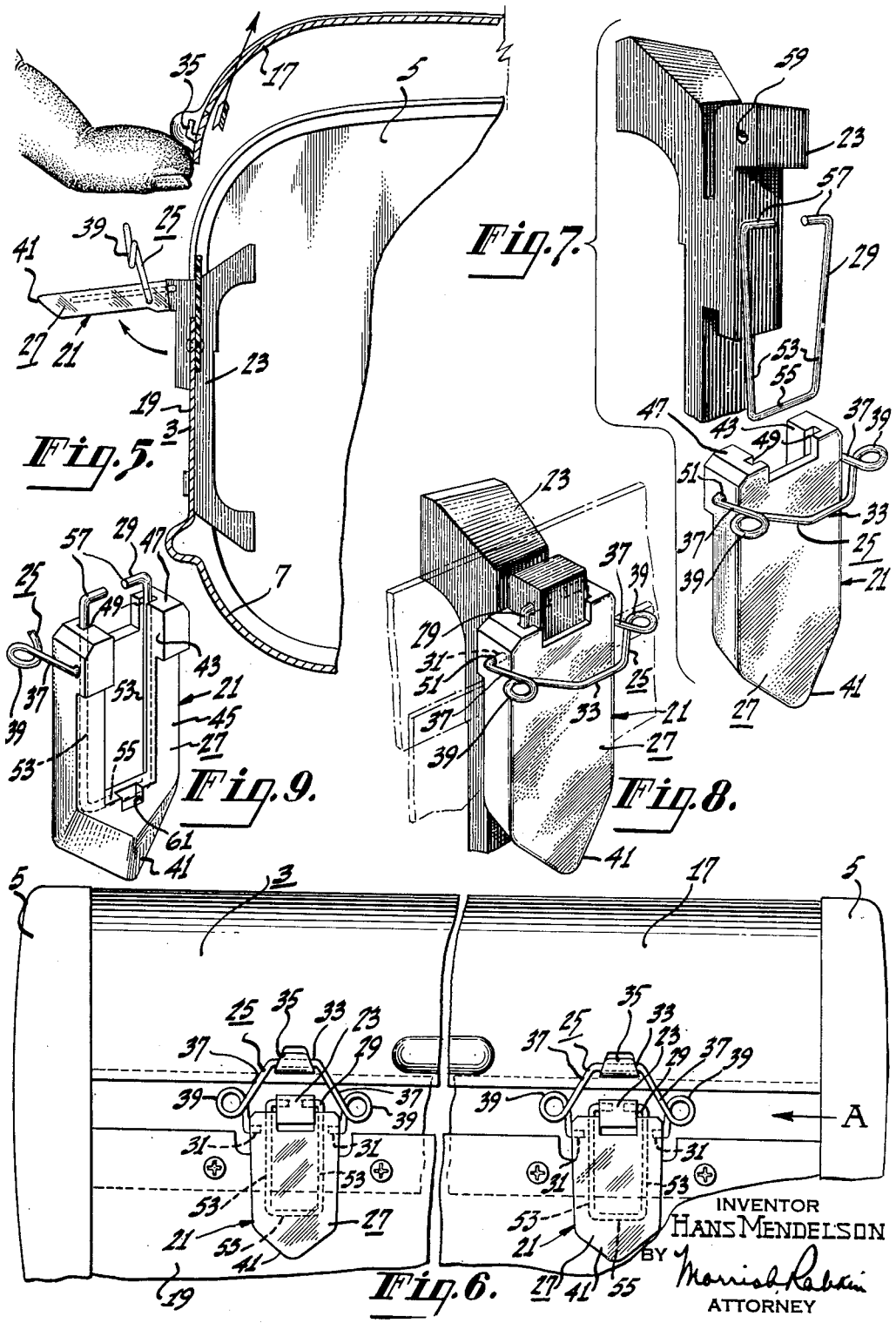
INVENTOR
HANS MENDELSON
BY
ATTORNEY Patented Dec. 9, 1952

2,621,286

UNITED STATES PATENT OFFICE 2,621,286

RADIO RECEIVER CASE, INCLUDING SNAP-LOCK FASTENER

Hans Mendelson, Camden, N. J., assignor to Radio Corporation of America, a corporation of Delaware Application March 17, 1951, Serial No. 216,135

8 Claims. (Cl. 250—16)

The present invention relates to an improved fastener or latch for securing the cover of a case in a tightly closed position, and more particularly to a snap-lock fastener which is especially suitable for covers of cases such as portable radio receiver cases.

Conventional fasteners or latches of the type to which the present invention is directed are frequently used to secure the cover of suitcases or trunks in a closed, locked position. The fastener of conventional design comprises generally, a U-shaped latch operated by a lever attached to the case. In effecting locking action, the latch is engaged with a hook or other suitable projecting catch on the cover. The lever is then operated to produce a toggle action which pulls the cover into a tightly secured, closed position while at the same time snapping itself into a locked position against the outer surface of the case.

Prior art fasteners of this type are found unsuitable for many applications for at least one of several reasons such as: (1) difficulty in replacing broken parts or elements; (2) the fastener is not self-adjusting to compensate for production variations; (3) the fastener does not provide a positive locking action; (4) the rivets used to pivotally connect the parts are located in rather inaccessible places making it difficult to assemble the fastener; and (5) use of rivets is often objectionable from the standpoint of neatness and occasional sharp protrusions present as a result of the riveting process.

It is a primary object of the present invention to provide an improved fastener or latch of the type operating with a toggle action which will be free from the aforementioned disadvantages.

It is also an object of the present invention to provide an improved design for a snap-lock fastener which is self-adjusting and which provides a positive locking action.

It is another object of the present invention to provide an improved fastener which is suitable for securing the covers of cases in tightly closed position and which is reliable and easy to assemble.

It is a further object of the present invention to provide an improved structure for a snap-lock fastener which is not only simple and easy to assemble, but which can also be quickly and easily disassembled for replacement of worn out or broken parts without damage to other parts associated therewith, and without use of any tool whatsoever.

It is a still further object of the present invention to provide a fastener which is particularly suitable for locking the cover of a portable radio receiver in a closed position.

Another object of the present invention is to provide a cover fastener for metal cases of electrical apparatus which will prevent the case from having a single-turn, short-circuiting effect on elements contained therein.

It is still another object of the present invention to provide an improved fastener for covers of cases which is simple and easy to construct, which can be manufactured at a minimum of cost, which permits wide tolerances for easy mass production, and which is highly efficient in use.

The snap-lock fastener of the present invention comprises a latch of resilient material pivotally mounted on an operating lever. The operating lever is provided with a slot for receiving a hinge for mounting the latch and lever on a case or other suitable support. The hinge is slidably mounted within the slot and is secured to the lever solely by frictional engagement therewith. The latch is mounted on the operating lever in a position with respect to the pivotal axis of the lever provided by the hinge such that the lever functions as a lever of the second class and operates with a toggle action.

The novel features characteristic of the present invention, as well as additional objects and advantages thereof, will be understood better from the following detailed description when read in connection with the accompanying drawing in which, Figure 1 is a perspective front view of a portable radio receiver embodying the present invention, Figure 2 is an enlarged rear elevation of the apparatus shown in Figure 1, a portion of the case and cover being broken away to show certain of the radio receiver components disposed therein, Figure 3 is an enlarged view, in section, taken along the line 3—3 of Figure 2, Figure 4 is a view similar to Figure 3 but taken along the line 4—4 of Figure 2, Figure 5 is an enlarged, side view, in section, showing the fastener in an unlocked position and with the cover raised to a partially open position, portions of the case and cover being broken away, Figure 6 is a bottom view of a portion of the case shown in Figure 1 showing the snap-lock fasteners of the present invention holding the cover in a closed position, Figure 7 is an exploded, perspective view of the snap-lock fastener of the present invention and a portion of the pivotal support for the fastener, Figure 8 is an assembled view of the elements shown in Figure 7 and illustrated in a mounted position on the case, the latter being shown in phantom, and Figure 9 is a perspective view of the operating lever shown in Figure 7 as seen from the opposite side thereof, and with the hinge in assembled position.

Referring more particularly to the drawings, wherein similar reference characters designate a portable radio receiver 1 provided with a metal case 3 of a type to which the present invention is particularly applicable. In general, the metal case 3 comprises a pair of hollow or recessed end walls 5 of suitable insulation material and sides 7 of conductive material, preferably made from thin, sheet aluminum, or other suitable lightweight metal. The front of the case is provided with a hinged lid 9 which, in its open position, exposes the tuning and volume adjusting controls (not shown) for the radio receiver chassis 11 mounted within the case. Also mounted within the case is a battery pack 13, and a loop antenna 15. The receiver chassis 11 is usually located in the upper half of the case while the battery pack 13 is located in the lower half. The loop antenna 15 is protectively located within the hollow or recess of an end wall 5. In order to make the parts located within the case accessible not only for servicing the receiver and replacing batteries, but also to facilitate changing the operation of an A. C.–D. C. set as between line current operation and battery operation, which, in some cases, requires connecting or disconnecting the line cord plug 18 with the socket connections 20, the portion 17 of the side wall forming the rear wall of the case is hinged or pivotally attached along the top edge thereof thereby forming a cover for the case.

In the particular embodiment illustrated in the drawings, the cover 17 extends around the lower edge thereof and terminates in spaced relation to that portion 19 of the side wall which forms the bottom of the case. Looking at the bottom 19 of the case, as shown particularly in Figures 5 and 6, a strip of insulating material is secured to the bottom in a manner to close the gap or space between the bottom and the cover 17 thereby to complete the closure provided by the case.

For the purpose of locking the cover 17 in a closed, latched position, as shown in Figures 3, 4 and 6, a pair of snap-lock fasteners 21 is mounted on the bottom adjacent the ends of the case. Each of the fasteners 21 is pivotally mounted on an outwardly projecting portion or foot support 23 extending from the bottom portion 19. The snap-lock fastener 21 comprises a latch 25, an operating lever 27 for the latch and a hinge 29 for pivotally mounting the operating lever on the outwardly projecting portion 23. The latch 25 comprises a resilient wire-like member of somewhat U-shape form. Portions 31 of the ends of the latch are directed inwardly toward each other and provide pivotal mounting means for the latch. An intermediate portion 33, which forms the base of the latch, is intended to provide a latch-engaging portion adapted to be brought into engagement with a hook or other suitable projection or catch 35 provided adjacent to the lower edge of the cover 17. The arm portions 37 of the latch between the end portions 31 and the intermediate portion 33 are provided with one or more compliant loops 39 which facilitate the spring-like action of the latch in drawing the cover to a closed position and insure a positive locking action by reason of the latch being under tension at all times, even considering production variations in the line up of all components involved.

The operating lever 27 is made from suitable insulating material, preferably molded and comprises a member of generally rectangular shape. One end 41 of the lever is arranged to provide a finger gripping portion. In the particular embodiment shown, the finger gripping portion, as seen from the top or bottom of the lever, is somewhat pointed and, as seen from the side, is beveled. The lever 27 is provided with a longitudinally disposed channel 43 extending inwardly from the bottom 45 thereof. Also extending longitudinally inwardly from the side forming the end 47 of the lever opposite the finger gripping action portion 41 is a longitudinally extending slot 49 provided by channel-like recesses formed in the side portions of the lever on opposite sides of the channel 45. A pair of apertures 51 are provided adjacent the end 47 of the lever which extend inwardly from opposite sides thereof. The apertures 51 are dimensioned to receive the end portions 31 of the latch whereby the latch is pivotally mounted on the operating lever. The latch 25 is made so that the arms 37 thereof must be spread apart in order to mount the latch end portions 31 within the apertures 51. The latch being a resilient member, the end portions 31 are arranged in spaced relation to each other an amount such that they will be constantly biased into the apertures.

The hinge 29 comprises a resilient, substantially C-shaped, wire-like member having a pair of arms 53, a portion 55 connecting the arms, and two end portions 57 directed toward each other and disposed with the ends thereof in spaced apart relation. The hinge 29 is arranged to be slidably mounted in the longitudinally extending slot 49 of the lever 27 with the end portions 57 projecting outwardly therefrom. The hinge arms 53 are arranged in non-parallel formation and are spaced apart an amount such that, when the hinge is inserted within the longitudinally extending slot 49, the hinge end portions 57 will be urged toward each other. Thus, the hinge is retained frictionally by the walls of the operating lever 27 defining the slot 49.

The hinge end portions 57 provide finger-like portions adapted to engage or fit within complementary apertures or recesses 59 provided in the outwardly projecting portion 23 on the bottom of the case. The hinge 29 is arranged, in its secured position within the lever, in a manner such that the finger-like portions 57 extend beyond the slotted end 43 of the lever thereby to provide a fulcrum or pivotal means for the lever when they are disposed within the apertures 59.

In assembling the hinge and lever on the case 3, the finger-like portions 57 are directed into the complementary apertures 59 simultaneously with inserting the hinge into the longitudinally extending slot 49 of the lever. The slot 49 is dimensioned so that, when the hinge 29 is fully inserted in the slot 49, relative movement between the finger-like portions 57 in directions away from each other is prevented. Once the hinge is assembled within the slot 49 of the lever, it may be found desirable to securely fasten it in place. For this purpose, a notch 61 is formed in the lever at the end of the channel 43 adjacent the finger gripping portion 41. The latch material forming this notch may be peened over the connecting portion 55 of the hinge thereby preventing withdrawal of the hinge from the lever. If, for example, the lever is made from a thermoplastic material, the portion thereof forming the notch 61 may be heated and the hinge sealed to the lever.

As seen particularly in Figures 5 and 6 of the drawing, the latch 25 is pivotally mounted on the lever 27 between the finger-like portions of the hinge 29 and the finger-gripping end of the lever 41. As seen in Figures 3 and 4, the latch 25 and the hinge 29 are disposed in different planes and with the fulcrum of the lever disposed in a manner such that the lever 27 functions as a lever of the second class. In addition thereto, the pivotal connection of the latch 25 on the lever 27 is disposed along a line parallel to but spaced from the plane including the arms 37 and the end portions 31 of the latch. This enables the fastener 21 to operate with a toggle-like or off-center-spring action.

In effecting locking action, thereby to secure the cover in a closed position on the case, the lever 27 is moved first to a raised position with respect to the bottom 19 of the case. The latch engaging portion 33 is next brought into engagement with the projecting catch 35 on the cover 17. The lever is then moved in a direction away from the cover so that it will lie in a position parallel to and adjacent the bottom of the case. In moving the lever toward the bottom of the case, the loops 39 add compliance to the spring-like action of the latch. As the lever 27 approaches its locked position, the latch snaps or forces the lever against the case bottom thereby providing a self-locking feature. Although the stressed portion of the latch is somewhat relieved from its locked position, the parts are arranged so that in their locked position the latch will still maintain tension on the cover and urge it into closed position with the case bottom. Thus, the fastener may be said to be self-adjusting so that it compensates for variations in alignment of the parts occasioned by manufacturing tolerances.

From the foregoing, it will be recognized that the present invention provides a positive latch for tightly closing the cover of a case. The parts are arranged and designed in such a manner that they may be easily replaced without damage to other parts with which they are associated. In addition, since the operating lever is made from insulated material, the metal case is prevented from forming a shorted turn for components of the radio receiver.

Although there is illustrated and described but a single embodiment of the present invention, it will be recognized by persons skilled in the art that various modifications and changes are possible within the spirit of the invention. For example, the latch arms 37 instead of being provided with loops to facilitate spring-like action may be provided with compliances of other design. Therefore, it is desired that the particular form of the present invention described herein shall be considered as illustrative and not as limiting.

What is claimed is:

1. In a snap-lock fastener for a case having a cover, said cover being provided with latch engaging means, a latch, an operating lever for said latch, said lever being provided with a slot extending inwardly from a side thereof, and means slidably mounted in said slot for pivotally connecting said lever to said case, said latch being pivotally mounted on said lever and disposed in a position relative to said pivotal connecting means such that said lever functions as a lever of the second class.

2. In a snap-lock fastener for a case having a cover, said cover being provided with latch engaging means, a latch, an operating lever for said latch, said lever being provided with a slot extending inwardly from a side thereof, and a hinge for said lever, said hinge having a portion thereof slidably mounted in said slot and at least one other portion thereof adapted for pivotal connection with said case, said latch being pivotally mounted on said lever and disposed in a position relative to said hinge pivotal connecting portion such that said lever functions as a lever of the second class.

3. The invention as defined in claim 2 wherein said hinge comprises a resilient wire element dimensioned to frictionally engage the walls of said lever defining said slot.

4. The invention as defined in claim 2 wherein said hinge comprises a substantially C-shaped element having portions of its ends directed toward each other in spaced apart relation to provide finger-like portions adapted to engage complementary recesses provided in said case and to be rotatable therein whereby said finger-like portions provide the fulcrum for said lever.

5. In a hollow metal case adapted to house a radio receiver, said case having end walls of insulating material, a cover, side walls of conductive material connecting said end walls, and a strip of insulating material attached to an edge of said side walls and to which said cover is fastened for preventing the case from acting as a short circuiting turn for components of a radio receiver disposed therein, a snap-lock fastener for securing said cover in a closed position, said fastener comprising latch engaging means attached to said cover, a latch, an operating lever of insulating material for said latch, said lever being pivotally mounted on said strip of insulating material, said latch being pivotally mounted on said lever and disposed in a position relative to the pivotal connection of said lever to said case such that said lever functions as a lever of the second class.

6. The invention as defined in claim 5 wherein said lever is provided with a slot extending inwardly from a side thereof, and wherein a hinge is provided for pivotally mounting said lever on said case, said hinge including a portion thereof slidable within said slot and frictionally engaging said lever.

7. The invention as defined in claim 6 wherein said hinge comprises a resilient C-shaped element having portions of its ends directed toward each other in spaced apart relation to provide finger-like portions adapted to engage complementary recesses in said case and to be rotatable therein whereby said finger-like portions provide a fulcrum for said lever.

8. The invention as defined in claim 7 wherein said slot is dimensioned to limit relative movement between said finger-like portions in directions away from each other upon disposal of said hinge portion within said slot thereby to prevent withdrawal of said finger-like portions from said recesses except upon separation of said lever from said hinge.

HANS MENDELSON.

REFERENCES CITED

The following references are of record in the file of this patent:

UNITED STATES PATENTS

| Number | Name | Date |
|---|---|---|
| 1,652,102 | Elmer et al. | Dec. 6, 1927 |
| 2,502,832 | Dockendoroff | Apr. 4, 1950 |
| 2,521,423 | Stuck | Sept. 5, 1950 |
| 2,538,525 | Kaltenbacher | Jan. 16, 1951 |

OTHER REFERENCES

Wilson Abstract of Application, Serial No. 602,136, published November 22, 1947.